United States Patent [19]

Matsui

[11] Patent Number: 4,676,609
[45] Date of Patent: Jun. 30, 1987

[54] ADJUSTABLE BOWS FOR LOUPE FRAME

[75] Inventor: Saburo Matsui, 1102, Suge, Tama-ku, Kawasaki-shi, Kanagawa, Japan

[73] Assignees: Saburo Matsui; Masakazu Yokoyama, both of Kanagawa, Japan

[21] Appl. No.: 555,821

[22] Filed: Nov. 28, 1983

[30] Foreign Application Priority Data

Nov. 26, 1982 [JP] Japan .......................... 57-177706[U]

[51] Int. Cl.[4] .......................... G02C 5/20; G02B 25/00
[52] U.S. Cl. .................................. 351/118; 351/113; 351/57; 350/146; 350/249
[58] Field of Search .................. 351/95, 111, 118, 57, 351/58, 156, 113; 350/249, 146

[56] References Cited

U.S. PATENT DOCUMENTS

| | | | |
|---|---|---|---|
| 633,023 | 9/1899 | Miehle | 351/113 |
| 1,562,046 | 11/1925 | Perrin | 350/146 |
| 3,458,246 | 7/1969 | Krebs | 350/146 |

*Primary Examiner*—Rodney B. Bovernick
*Assistant Examiner*—P. M. Dzierzynski
*Attorney, Agent, or Firm*—James H. Tilberry

[57] ABSTRACT

An adjustable loupe frame is provided consisting of telescopic, spring-biased right and left bows and a loupe mounting bracket extending between and joined pivotably to the front ends of telescopic bows. The bows are adjustable to vary the distance between the loupe and the eyes of a viewer, so that an object to be viewed can be focused properly at any time.

3 Claims, 6 Drawing Figures

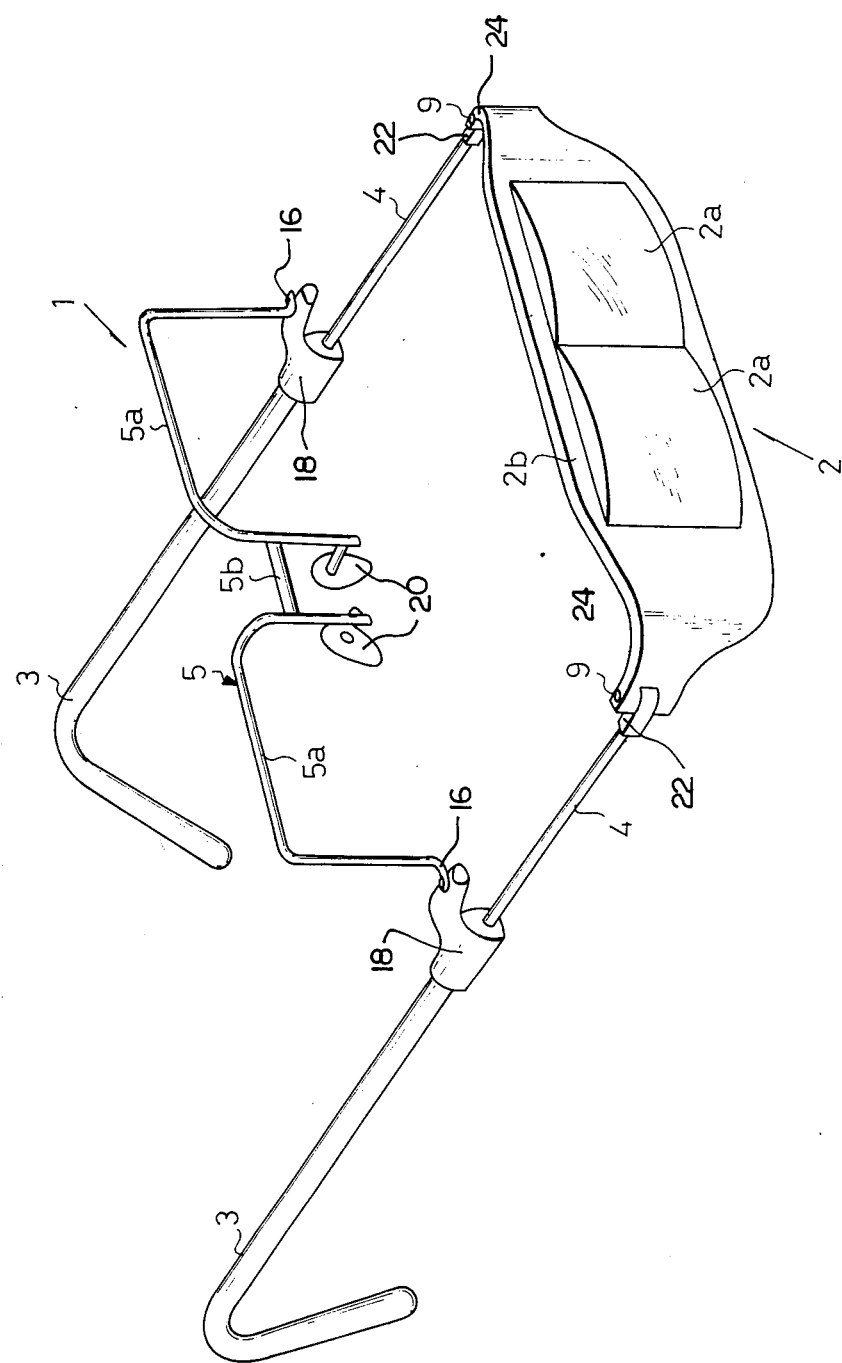

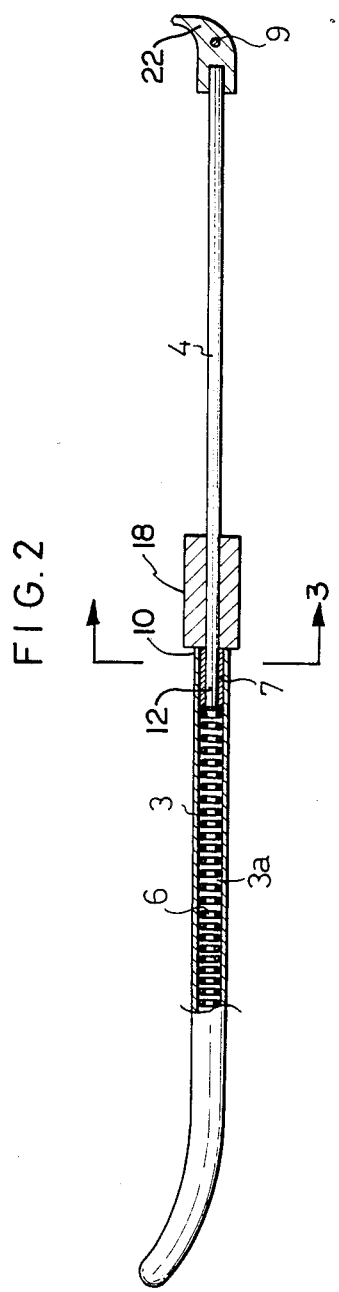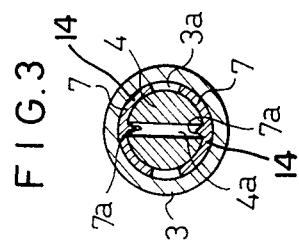

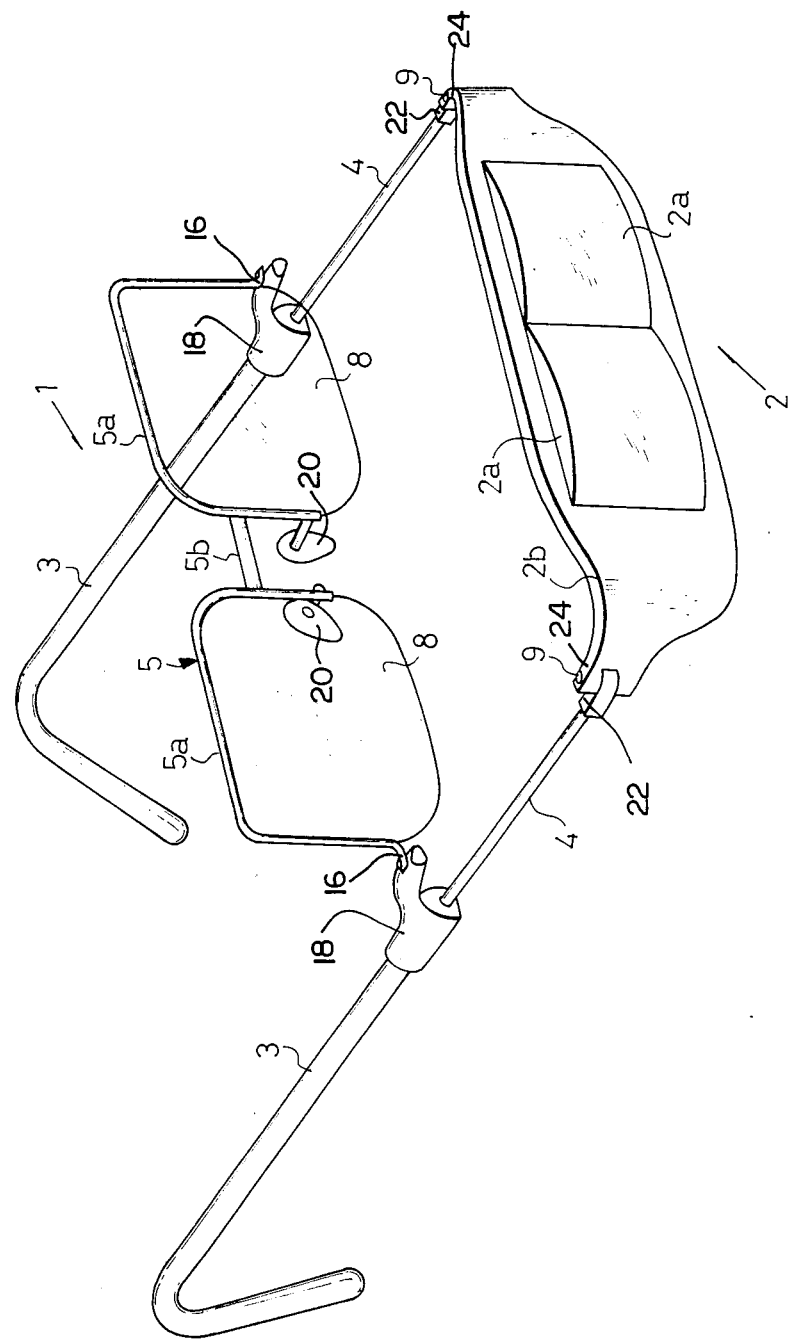

ADJUSTABLE BOWS FOR LOUPE FRAME

This invention relates to an adjustable loupe frame capable of regulating a distance between the loupe and the eyes of the user.

In order to make an article, which requires minute manual work during the production thereof, it is necessary in many cases that such manual work be carried out with a magnifying glass held by hand. However, when such manual work is carried out for a long period of time the strain of working under these conditions is tiring. When minute manual work requires both hands to be used, it is necessary to interrupt the work frequently.

It is difficult for a worker who is presbyopic to view an object which is a short distance away. This disability can be corrected with prescription glasses. However, prescription glasses are so ground that, when a presbyope wears them, the distance between his eyes and the lenses is always kept constant. Therefore, objects not within the focal length of his correction are difficult to see clearly. In such a case, a presbyope must use a supplementary optic lens.

In order to solve these problems, loupes consisting, for example, of a helmet-like frame and magnifying lenses fitted therein have been provided. However, the helmets of such construction are very tiring to wear. When a person wears such an apparatus for a long period of time, he tends to become irritated and tired. Moreover, such apparatus is not adaptable for viewing objects of varying distances from the eyes.

It is an object of the invention to provide an adjustable loupe frame.

It is another object of the invention to provide a loupe frame having easily retractable and extendable telescopic bows.

It is yet another object of the invention to provide a loupe frame with provision for mounting prescription lenses between the eyes of the user and the loupe.

It is still another object of the invention to provide a loupe frame which can be worn on the head of a user in conjunction with the user's prescription glasses and having means for easily adjusting the distance between the loupe and the prescription lenses.

The above and other objects of the invention will become apparent from the following description of the preferred embodiments of the invention, taken in conjunction with the accompanying drawings, in which:

FIG. 1 is a perspective view of a preferred embodiment of the invention;

FIG. 2 is a plan view of a bow, partially in section;

FIG. 3 is a vertical section of the bow taken along the line 3—3 of FIG. 2;

FIG. 6 is a perspective view of another preferred embodiment of the invention.

Figure 4:
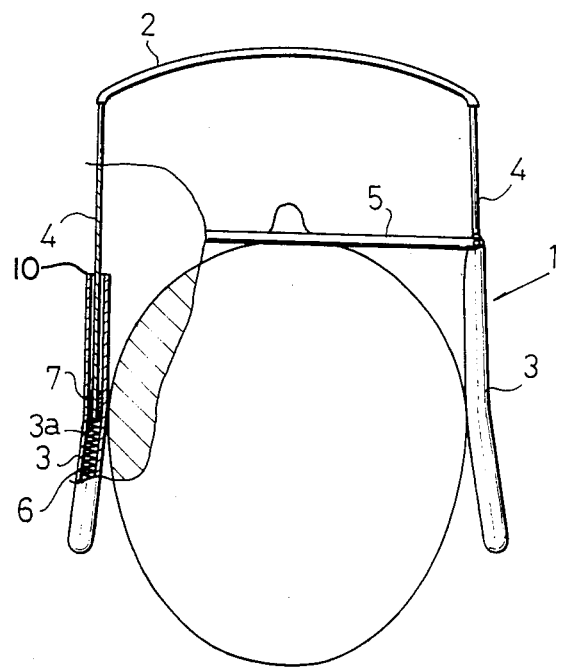
FIG. 4 is a plan view partially in section of a preferred embodiment of the invention shown in association with the head of a user.
Figure 5:
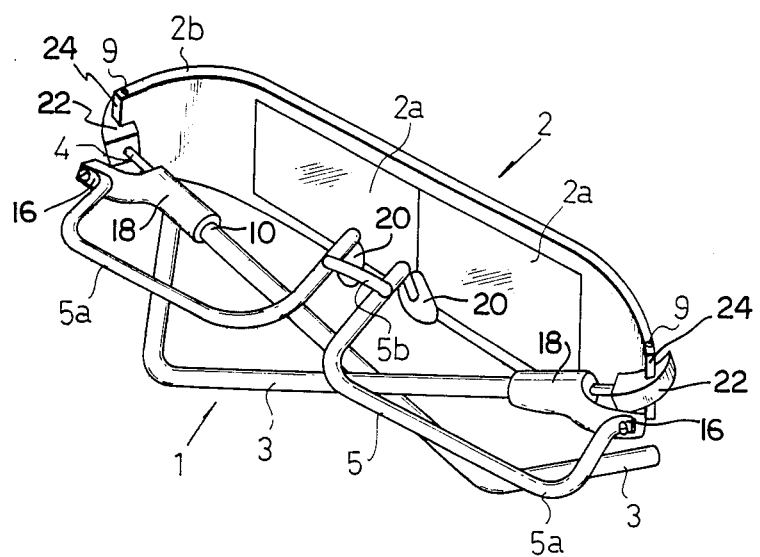
FIG. 5 is a perspective view of a preferred embodiment of the invention showing the bows folded behind the loupe.

The present invention, which has been developed in view of the above-mentioned problems with conventional loupes, will now be described.

Referring to FIG. 1, there is shown a frame 1, including a loupe holder 2, right and left bows 3, retractable members 4—4 telescopically inserted into the bows 3, and a bridge 5.

As best shown in FIG. 2, each of the bows 3 is hollow, and a coil spring 6 of a small diameter is sized to be received within hollow 3a in the bow 3 so as to extend in the axial direction thereof.

The bow 3 is open at its front end 10, and the leading end 12 of retractable member 4 is freely fitted into the hollow 3a of the bow 3 from the front end 10 until abutting contact is made with the adjacent end of coil spring 6. Further insertion of the retractable member 4 will compress coil spring 6, wherein coil spring 6 will tend to urge retractable member 4 from left to right as seen in FIG. 2. The front end 10 of the bow 3 is crimped to a diameter slightly less than that of the bow 3. A split or two-part sleeve 7 is slidingly movable in the hollow 3a, and fastened to the leading end 12 of the retractable member 4. Each portion 14 of sleeve 7 is provided with a small projection 7a (see FIG. 3). Leading end 12 is provided with a slot 4a into which the small projections extend radially inwardly to form interlocking engagement. Because of the crimped front end 10 of bow 3, sleeve 7 and slotted leading end 12 of members 4 are secured against removal from hollow 3a of bow 3.

A prescription lens holding bridge 5 extending between the bows 3—3 is fastened at its opposite ends 16 (FIG. 1) to sleeve bridge supports 18, respectively. In order to prevent the bridge 5 from obstructing the user's visual field, it is formed so as to have substantially inverted U-shaped right and left members 5a, which are connected together by a bridge member 5b provided therebetween. The right and left bridge members 5a are used as necessary to attach myopic or astigmatic lenses 8 thereto (FIG. 6). For this purpose, the bridge members 5a may be provided, for example, with lens mounting grooves (not shown). Nose pads 20 are also provided, with or without lenses 8, in order to position and to support the loupe frame on the head of the user.

The loupe unit 2 extends between and is joined to front end portions 22 of the retractable members 4, 4. This loupe unit 2 consists of plastic magnifying lenses 2a and lens frame 2b, which are formed from a monolithic mold. The retractable members 4 are fastened to right and left end portions 24 of the lens frame 2b via vertical pins 9 in such a manner that the retractable members 4 can be folded freely. When the right and left bows 3 are in an unfolded state, ready to be put around the ears, they, of course, extend in parallel with each other. The magnifying lenses 2a in use should have a comparatively low magnification of 1.3–1.8 (the magnification of a regular magnifying glass is 2–3).

In order to wear the loupe according to the present invention, the bows 3, if in a folded state, are unfolded until they are parallel. Consequently, the retractable members 4 are urged outwardly by the coiled springs 6 without meeting with any resistance. The loupe frame is then mounted on the head of the user, and the loupe unit 2 is pressed backward. As a result, the retractable members 4 are telescoped into the hollows 3a. When the distance between the eyes and loupe unit 2 is satisfactory, the hand, by which the loupe unit is adjusted, is removed therefrom. The members 4 hold their positions relative to bows 3 because they have been pressed against the inner walls of the bows 3 which have been flexed outward to be slightly curved. The frictional contact between bows 3 and members 4 is sufficient to hold members 4 in position until again hand-adjusted.

After the loupe according to the present invention has been used, it is removed from the ears and nose of the wearer, and the magnifying lens unit 2 is pressed backward to fully telescope the retractable members 4 into the bows 3, which are then folded. Thereafter, the bows 3 are pivoted to cause the bridge 5 to fall, and the lens unit 2 is put in a diagonally standing state.

The loupe frame according to the present invention permits specially minute manual work to be carried out by both hands at all times. Since a distance between the magnifying lenses and eyes can be easily regulated to always keep an object in focus, the user can carry out his manual work without becoming fatigued. Moreover, the spring-biased retractable members 4 are inserted into the bows, to enable the regulation of distance to be done easily. After the loupe frame is positioned on the wearer, the retractable members, to which the lens unit is joined, are forced into the bows, and the retractable members are fixed automatically owing to the frictional movement thereof with respect to the inner circumferential surfaces of the bows, as aforesaid. Thus, the loupe frame according to the present invention is constructed simply, is substantially free from breakage, and can be manufactured at a low cost.

Having described preferred embodiments of the invention, it will be clear to those skilled in the art that additional embodiments, modifications, and improvements may be made without departing from the intended scope of the invention as defined in the appended claims.

What is claimed is:

1. Adjustable bows for a loupe frame comprising: cylindrical bows pivotally secured to opposite sides of said loupe frame and having free ends with detent-engaging recesses therein; tubular bow extensions having open ends telescoped over said cylindrical bows; coiled springs housed within said tubular bow extensions and sized to be compressible by the free ends of said bows; sleeve means within each of said tubular bow extensions having detents in engagement with said detent-engaging recesses and slidably supporting the free ends of said cylindrical bows in said tubular bow extensions; said sleeve means each having the form of a cylindrical tube with a longitudinal split; means to contain said sleeve means within said open ends of said tubular bow extensions, said tubular bow extensions being slightly curved wherein said split sleeves mounted on the free ends of said cylindrical bows provide frictional resistance with the internal wall surfaces of said tubular bow extensions sufficient to hold said cylindrical bows in a first position until manually shifted to a second position relative to said tubular bow extensions.

2. The device of claim 1, including rotatable sleeves rotatably mounted on said cylindrical bows and a frame for prescription lenses pivotally secured at opposite sides to adjacent rotatable sleeves, said rotatable sleeves, upon folding of said tubular bows inwardly, being adapted to revolve upon said cylindrical bows to shift said prescription lens frame from a plane parallel with said loupe frame to a plane substantially normal to said loupe frame.

3. A loupe frame comprising: cylindrical bows pivotally secured to opposite sides of said loupe frame and having free ends with detent-engaging recesses therein; tubular bow extensions having open ends telescoped over said cylindrical bows; coiled springs housed within said tubular bow extensions and sized to be compressible by the free ends of said bows; sleeve means within each of said tubular bow extensions having detents in engagement with said detent-engaging recesses and slidably supporting the free ends of said cylindrical bows in said tubular bow extensions; said sleeve means each having the form of a cylindrical tube with a longitudinal split; means to contain said sleeve means within said open ends of said tubular bow extensions, said tubular bow extensions being slightly curved wherein said split sleeves mounted on the free ends of said cylindrical bows provide frictional resistance with the internal wall surfaces of said tubular bow extensions sufficient to hold said cylindrical bows in a first position until manually shifted to a second position relative to said tubular bow extensions; rotatable sleeves rotatably mounted on said cylindrical bows; and a frame for prescription lenses pivotally secured at opposite sides to adjacent rotatable sleeves, said rotatable sleeves, upon folding of said tubular bows inwardly, being adapted to revolve upon said cylindrical bows to shift said prescription lens frame from a plane parallel with said loupe frame to a plane substantially normal to said loupe frame.

* * * * *